United States Patent [19]
Tachibana

[11] Patent Number: 5,848,048
[45] Date of Patent: Dec. 8, 1998

[54] OPTICAL DISC REPRODUCING APPARATUS, SIGNAL PROCESSING APPARATUS AND METHOD OF THE SAME

[75] Inventor: Kaoru Tachibana, Kanagawa, Japan

[73] Assignee: Sony Corporation, Tokyo, Japan

[21] Appl. No.: 896,357

[22] Filed: Jul. 18, 1997

[30] Foreign Application Priority Data

Jul. 31, 1996 [JP] Japan .................................. 8-201729

[51] Int. Cl.$^6$ ....................................................... G11B 7/00
[52] U.S. Cl. ................................................. 369/124; 369/59
[58] Field of Search ............................. 369/124, 59, 32, 369/47, 48, 54

[56] References Cited

U.S. PATENT DOCUMENTS 5,710,750  1/1998  Tachibana .................................. 369/59

Primary Examiner—Tod R. Swann
Assistant Examiner—Kim-Kwok Chu
Attorney, Agent, or Firm—Frommer Lawrence & Haug, LLP; William S. Frommer

[57] ABSTRACT

An optical disc reproducing apparatus capable of detecting data with a high precision without being affected by a low frequency component of a modulation code, comprising a high-pass filter for cutting off the low frequency component contained in the reproduced signal by a predetermined cut-off frequency, an envelope detecting means for detecting the envelope of said reproduced signal, a digitizing means for digitizing said reproduced signal, a gain controlling means for controlling the gain of said digital signal, a low-pass filter for cutting off the high frequency component contained in said gain-controlled digital signal by said cut-off frequency and generating a feedback signal, and an adding means for adding said reproduced signal and said feedback signal and outputting the same as an added signal to said digitizing means.

17 Claims, 4 Drawing Sheets

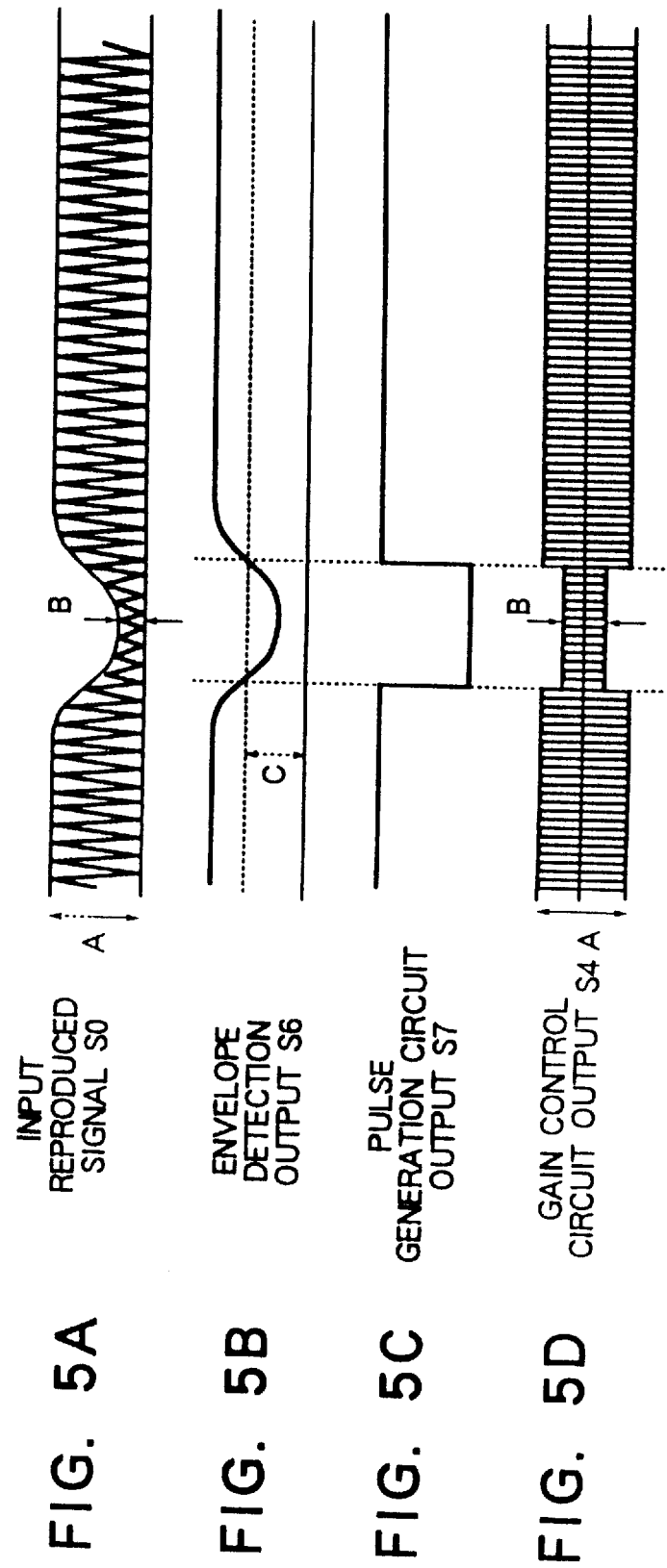

OPTICAL DISC REPRODUCING APPARATUS, SIGNAL PROCESSING APPARATUS AND METHOD OF THE SAME

BACKGROUND OF THE INVENTION

1. Field of the Invention

The present invention relates to an optical disc reproducing apparatus capable of suitably coping with even an abrupt amplitude change of the reproduced signal and to a signal processing apparatus and method of the same.

2. Description of the Related Art

In recent years, in a magneto-optical disc and additional write type optical disc for recording digital data, a modulation code having a DC component and low frequency component such as a run length code RLL (1.7) has been adopted for improvement of the recording line density.

In the reproduced signal of the optical disc, there is low band noise due to a dirt and dust on the optical disc surface, a defect of the media, a nonuniformity of the reflectance, a nonuniformity of the fluctuation of the recording sensitivity, residual error of the focus and tracking servo, etc., therefore in order to prevent an error in detection of data, it is necessary to remove such low band noise.

Conventionally, in order to remove such low band noise, a low band cutoff filter, that is, a highpass filter, has been used.

However, the low band noise as mentioned above and the low frequency component of the modulation code have a common band part, so there is a disadvantage in that if a high-pass filter is used so as to remove the low band noise, the low frequency component of the modulation code is removed together with the noise and the number of detection errors is increased.

SUMMARY OF THE INVENTION

An object of the present invention is to provide an optical disc reproducing apparatus with which the data can be detected with a high precision without being affected by the low frequency component of the modulation code.

Further, another object of the present invention is to provide a signal processing apparatus and a method of same for processing a reproduced signal reproduced from an optical disc to detect the data with a high precision without being affected by the low frequency component of the modulation code.

To achieve the above objects, there is provided an optical disc reproducing apparatus for reproducing from an optical disc on which data having a low frequency component is recorded comprising; a high-pass filter for cutting off the low frequency component contained in the reproduced signal by a predetermined cut-off frequency, an envelope detecting means for detecting the envelope of the reproduced signal, a digitizing means for digitizing the signal based on the reproduced signal from the high-pass filter and generating a digital signal, a gain controlling means for controlling the gain of the digital signal so that an amplitude of the digital signal becomes equal to or lower than the amplitude of the reproduced signal in accordance with the envelope, a low-pass filter for cutting off the high frequency component contained in the gain-controlled digital signal by the cut-off frequency and generating a feedback signal, and an adding means for adding the reproduced signal from the high-pass filter and the feedback signal from the low-pass filter and outputting the same as said signal to be digitized to the digitizing means.

Preferably, the gain controlling means controls the gain of the digital signal based on a pulse signal obtained by digitalizing the envelope with a predetermined comparison level.

Further preferably, the gain controlling means switches the connection of a resistor of an internal portion in accordance with the envelope.

Further, to achieve the above objects, there is provided a signal processing apparatus for processing a reproduced signal reproduced from an optical disc comprising; a band restricting means for applying a band restriction that removes the low frequency component contained in the reproduced signal in a period for which the reproduced signal has a high frequency and applying no band restriction with respect to the reproduced signal in periods other than the period for which the reproduced signal has the high frequency, a detecting means for detecting a level fluctuation of the reproduced signal, and a controlling means for controlling the band restricting means in response to the level fluctuation detected by the detecting means.

Preferably, the band restricting means includes a high-pass filter for cutting off the low frequency component contained in the reproduced signal with the predetermined cut-off frequency and a low-pass filter for passing the low frequency component cut off by the high-pass filter.

Further preferably, the low-pass filter is a circuit for supplementing the signal of the frequency component cut off by the high-pass filter in periods other than the period for which the reproduced signal has the high frequency.

Further, a signal processing apparatus of the present invention further comprises a coding means for coding the output signal from the high-pass filter and supplying the coded signal to the low-pass filter.

Preferably, the detecting means comprises an envelope detecting means for detecting the envelope of the reproduced signal.

Further preferably, the controlling means comprises a gain controlling means for receiving the coded signal coded by the coding means and controlling the gain of the coded signal.

Further preferably, the gain controlling means controls the gain of the coded signal in response to the detection pulse output from the envelope detecting means.

Further, to achieve the above objects, there is provided a signal processing method for processing a reproduced signal reproduced from an optical disc comprising the steps of; applying band restriction processing that removes a low frequency component contained in the reproduced signal in a period for which the reproduced signal has a high frequency and does not remove the low frequency component contained in the reproduced signal in a period for which the reproduced signal does not have the high frequency, controlling the gain of the signal to be apply the band restriction processing in response to the level fluctuation of the reproduced signal reproduced from the optical disc, and coding the band-restricted reproduced signal.

Preferably, the band restriction processing is carried out by a high-pass filter for cutting off the low frequency component contained in the reproduced signal with a predetermined cut-off frequency and a low-pass filter for passing the low frequency component cut off by the high-pass filter.

Further preferably, in the gain controlling step, the gain of the signal coded by the coding step is controlled in response to the level fluctuation of the reproduced signal reproduced from the optical disc.

Specifically, the gain-controlled coded signal is supplied to the low-pass filter.

Note that, the low-pass filter is a circuit for supplementing the signal of the frequency component cut off by the high-pass filter in periods other than the period for which the reproduced signal has the high frequency.

Preferably, the level fluctuation of the reproduced signal is detected by detecting the envelope of the reproduced signal.

Further preferably, the gain of the coded signal is controlled in response to the detection pulse output based on the level fluctuation of the detected envelope.

BRIEF DESCRIPTION OF THE DRAWINGS

These and other objects and features of the present invention will become more apparent by the following description of the preferred embodiments given with reference to the attached drawings, wherein

FIG. 5A is a waveform view of the reproduced signal S0;

FIG. 5B is a waveform view of a detection signal S6;

FIG. 5C is a waveform view of a pulse signal 8B; and

FIG. 5D is a waveform view of a conventional signal S4.

DESCRIPTION OF THE PREFERRED EMBODIMENTS

Below, an explanation will be made of the optical disc reproducing apparatus according to an embodiment of the present invention.

Figure 1:
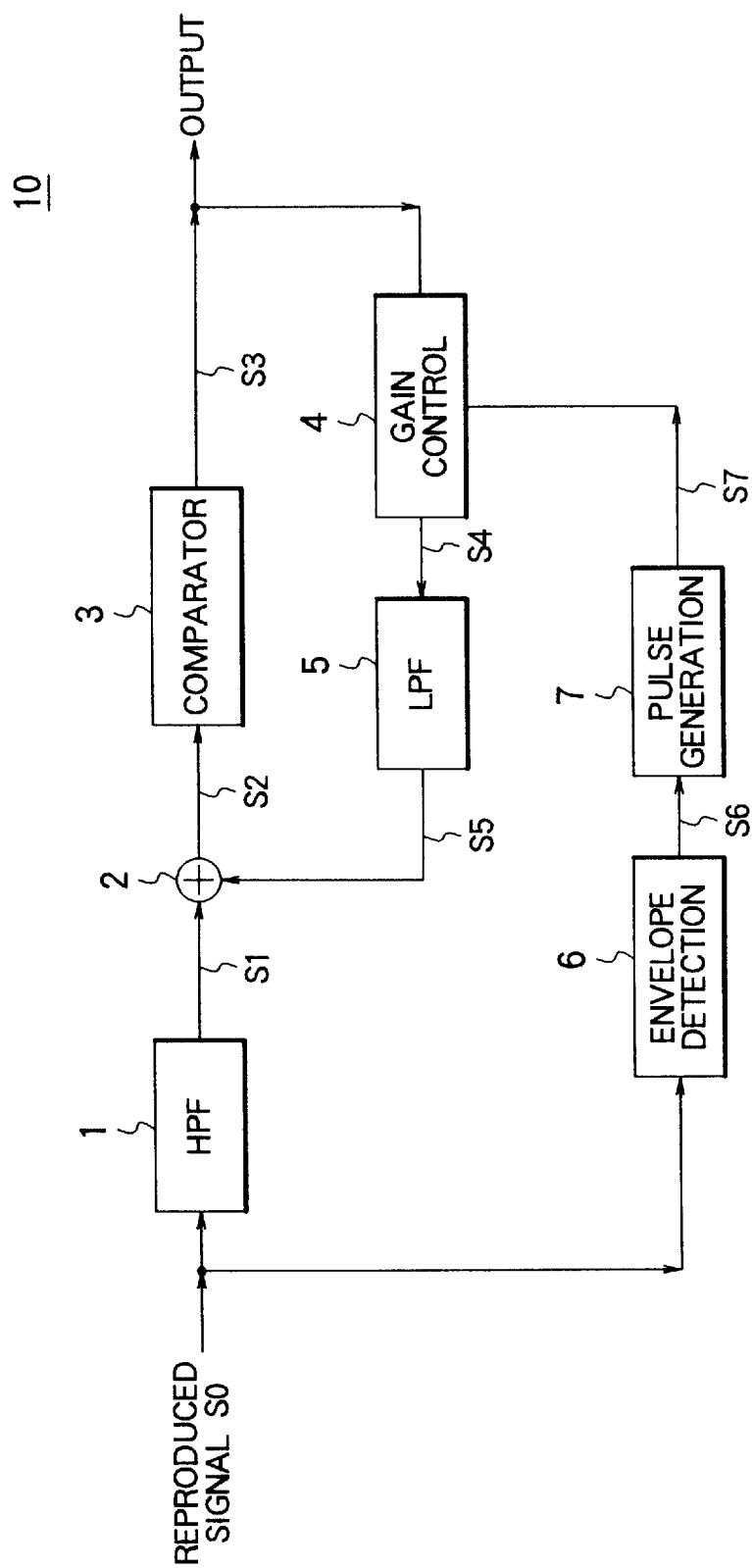
FIG. 1 is a view of the configuration of an optical disc reproducing apparatus according to an embodiment of the present invention.

FIG. 1 is a view of the configuration of an optical disc reproducing apparatus 10 of the present embodiment.

As shown in FIG. 1, the optical disc reproducing apparatus 10 is constituted by a high-pass filter (HPF) 1, an adder 2, a comparator circuit 3, a gain control circuit 4, a low-pass filter (LPF) 5, an envelope detecting circuit 6, and a pulse generating circuit 7.

The high-pass filter 1 carries out high-pass filtering with respect to the reproduced signal S0 with a cut-off frequency $1/(2\pi RC)$ Hz and outputs the filtered reproduced signal S1 to the adder 2. By this filtering, the low band noise contained in the reproduced signal S0 is removed. At this time, simultaneously, also the low frequency component of the reproduced signal S0 is removed. For example, where the reproduced signal S0 as shown in FIG. 2A is input, the reproduced signal S1 as shown in FIG. 2B is output.

Figure 3:
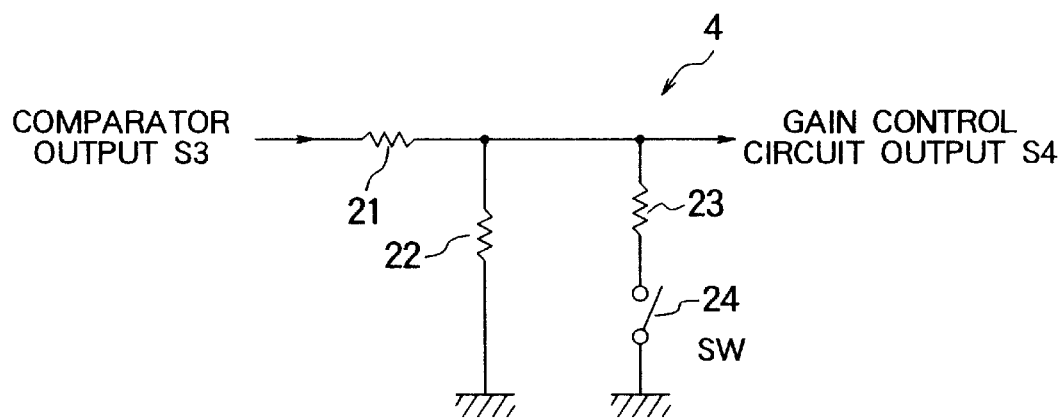
FIG. 3 is a view of the configuration of a high-pass filter and a low-pass filter shown in FIG. 1.

The high-pass filter 1 functions as a high-pass filter with respect to the reproduced signal S0 by arranging the capacitor 11 and the resistor 12 as shown in FIG. 3.

The adder 2 adds the reproduced signal S1, after removal of the low band noise and low frequency component, and the feedback signal S5 from the low-pass filter 5 and outputs the added signal S2 thereof to the comparator circuit 3. The added signal S2 is obtained by adding the feedback signal S5 containing the removed low frequency component to the reproduced signal S1 after removing the low frequency component and is a reproduced signal in which the low frequency component is reproduced.

Figure 2:
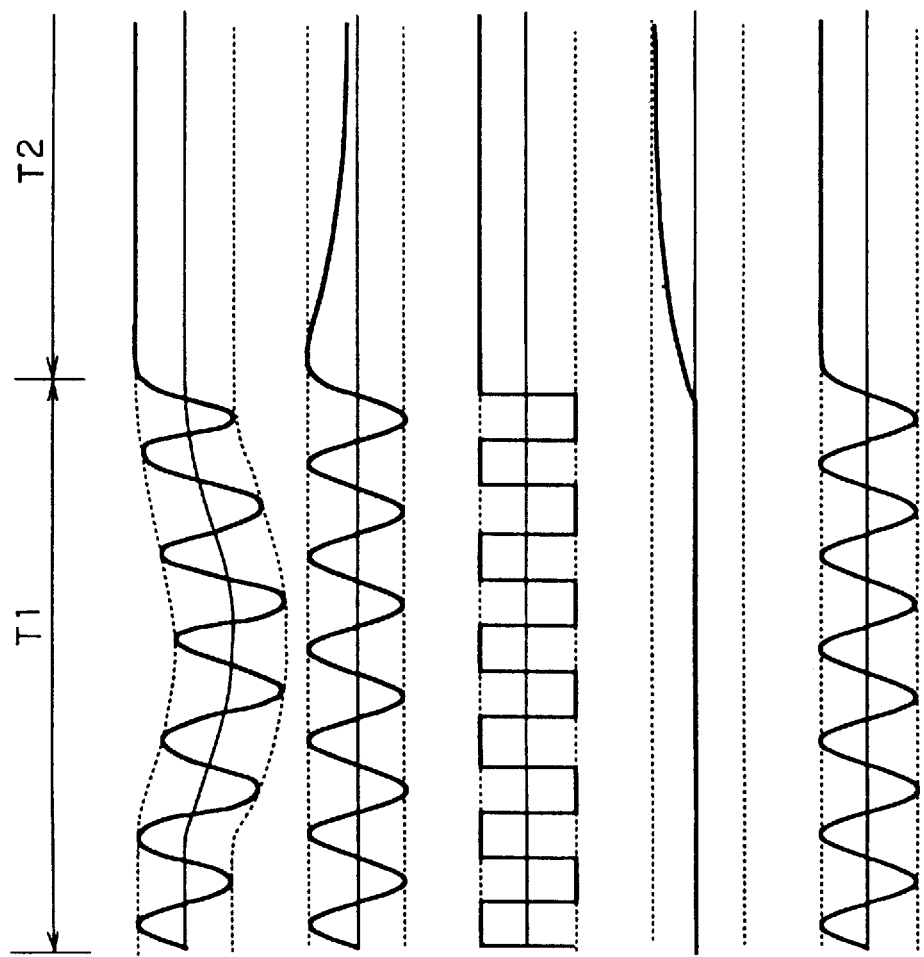
FIG. 2A is a waveform diagram of a reproduced signal S0.
FIG. 2B is a waveform diagram of a reproduced signal S1 after high-pass filtering.
FIG. 2C is a waveform diagram of a digital signal S3.
FIG. 2D is a waveform diagram of a feedback signal S5.
FIG. 2E is a waveform diagram of an added signal S2.

For example, in the case of the reproduced signal S0 and the feedback signal S5 as shown in FIGS. 2A and 2D, it becomes the added signal S2 as shown in FIG. 2E.

The comparator circuit 3 is a circuit for encoding the added signal S2. Specifically, this comparator circuit 3 digitalizes the added signal S2 with a predetermined comparison level, outputs this digital signal S3 as the reproduction output of the optical disc reproducing apparatus 10, and, at the same time, outputs the same as the feedback signal S3 to also the gain control circuit 4. For example, where the waveform of the added signal S2 is as shown in FIG. 2E, the waveform of the digital signal S3 becomes as shown in FIG. 2C.

The gain control circuit 4 controls the gain of the feedback signal S3 to a proper value and outputs the controlled feedback signal S4 to the low-pass filter 5.

Here, the proper value is a value that makes the amplitudes of the reproduced signal S0 and the feedback signal S4 equal.

Figure 4:
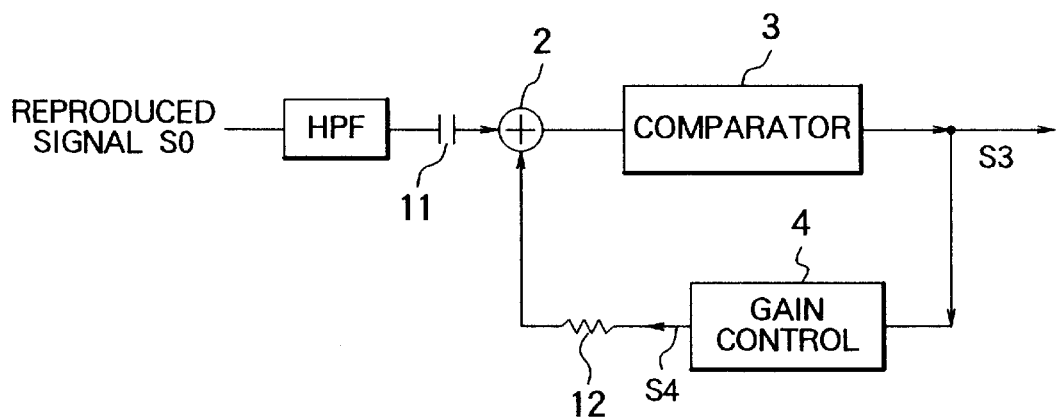
FIG. 4 is a view of the configuration of a gain control circuit shown in FIG. 1.

The gain control circuit 4 comprises fixed resistors 21, 22, and 23 and a switch 24 as shown in for example FIG. 3. In this example, when the pulse signal S7 shown in FIG. 5C becomes low level, the switch 24 is closed and the gain attenuation amount becomes large in comparison with a case where the switch 24 is opened. At this time, the time when the pulse signal S7 becomes the low level is the time when the level of the reproduced signal S0 is lowered, therefore the amplitude of the feedback signal S4 is made smaller than the amplitude of the reproduced signal S0 corresponding to this lowering and divergence of the feedback loop is prevented. Note that, a sufficient effect is obtained even if the resistance value of the fixed resistor 23 shown in FIG. 4 is 0 ohm. This is because the frequency of occurrence of reduction of the amplitude in the part where the low frequency component of the signal is large is not so high in practice.

For example, when the level of the pulse signal S7 changes as shown in FIG. 5C, the level of the feedback signal S4 changes as shown in FIG. 5D.

The low-pass filter 5 carries out the low-pass filtering with respect to the feedback signal S4 with the cut-off frequency $1/(2\pi RC)$ Hz and outputs the filtered feedback signal S5 to the adder 2. Here, both of the cut-off frequencies of the high-pass filter 1 and the low-pass filter 5 are set to $1/(2\pi RC)$ Hz. That is, this low-pass filter 5 has a complementary frequency characteristic with respect to the high-pass filter 1, therefore the low frequency component of the reproduced signal S0 lost at the high-pass filter 1 is contained in the feedback signal S5 output from this low-pass filter 5.

The low-pass filter 5 functions as the low-pass filter with respect to the feedback signal S4 by arranging the capacitor 11 and the resistor 12 as shown in FIG. 4.

For example, the waveform of the feedback signal S5 becomes as shown in FIG. 2D where the waveform of the digital signal S3 is as shown in FIG. 2C.

The envelope detecting circuit 6 receives as its input the reproduced signal S0, carries out the envelope detection thereof, and outputs the detection signal S6 to the pulse generation circuit 7.

For example, where the waveform of the reproduced signal S0 is as shown in FIG. 5A, the waveform of the detection signal S7 becomes as shown in FIG. 5B.

The pulse generation circuit 7 outputs the pulse signal S7 obtained by converting the detection signal S6 to the form of a pulse with a predetermined comparison level to the gain control circuit 4.

For example, where the waveform of the detection signal S6 is as shown in FIG. 5B, the waveform of the pulse signal S7 becomes as shown in FIG. 5C.

Next, an explanation will be made of the method of removal of the low frequency component of the reproduced signal in the optical disc device shown in FIG. 1 by referring to FIG. 2A to FIG. 2E.

First, the reproduced signal S0 from the optical disc shown in FIG. 2A is supplied to the reproducing apparatus 10 of the present invention. The low frequency component of this supplied reproduced signal S0 is removed by the high-pass filter 1. For example, where the reproduced signal S0 as shown in FIG. 2A is supplied to this high-pass filter 1, the reproduced signal Si after removing the low frequency component as shown in FIG. 2B is output from this high-pass filter 1. Next, this reproduced signal S1 is supplied to the comparator circuit 3. This comparator 3 codes the received reproduced signal S1 by comparing the same with the predetermined level. For example, where the reproduced signal S1 shown in FIG. 2B is supplied to this comparator circuit 3, the coded signal S3 as shown in FIG. 2C is output from this comparator circuit 3. This coded signal S3 is supplied to the gain control circuit 4.

This gain control circuit 4 controls the gain of the coded signal S3 in response to the pulse signal S7 from the pulse generation circuit 7. In the explanation concerning the method of removal of this low frequency component, for convenience of explanation, it is assumed that the gain of the coded signal S3 is not controlled by this gain control circuit 4 at all. Accordingly, in this case, the output signal S4 from the gain control circuit is the same signal as the coded signal S3. The output signal S4 of the gain control circuit 4 is supplied to the low-pass filter 5. Note that, the control operation of this gain control circuit will be explained in detail later.

The low-pass filter 5 allows only the low frequency component of the output signal S4 (the signal S4 is the same signal as the signal S3 in the above example) to pass therethrough. For example, where the output signal S4 shown in FIG. 2C is supplied, the output signal S5 shown in FIG. 2D is output from this low-pass filter 5. This low-pass filter 5 has the same frequency characteristic as that of the high-pass filter 1, therefore the part of the signal S5 output from this low-pass filter in the period T2 is exactly the same as the part of the signal in the period T2 having the low frequency component removed by the high-pass filter 1. The output signal 5 of this low-pass filter 5 is supplied to the adder circuit 2.

The adder circuit 2 adds the output signal S1 from the high-pass filter 1 and the output signal S5 from the low-pass filter 5. The signal S2 added in this adder circuit 2 has become the signal not affected by the low-pass filter 5 in the period T2 as shown in FIG. 2E.

Here, an explanation will be made of the reason why the low-pass filter 5 was provided by referring to FIGS. 2A to 2E again.

First, in the example shown in FIGS. 2A to 2E, the period "T1" is defined as the period for which the reproduced signal S0 has a high frequency, and the period "T2" is defined as the period for which the reproduced signal S0 does not have a high frequency.

The high-pass filter 1 cuts the low frequency component by the predetermined frequency characteristic set in the filter regardless of the period T1 and the period T2. Accordingly, it not only cuts the low frequency component of the part of the reproduced signal S1 of period T1, but also cuts the low frequency component of the part of the reproduced signal S1 of period T2 which originally must not to be cut.

In the example shown in FIGS. 2A to 2E, an error code is not generated in the coded signal, but for example, in the period T2, when assuming that the reproduced signal level is slightly lowered due to dust etc. on the optical disc, the level of the reproduced output S1 of the high-pass filter is lowered along with this. As a result, the level of the lowered reproduced signal S1 becomes lower than the level of the threshold of the comparator 3 for coding the reproduced signal S1, and as a result, erroneous coding is sometimes carried out.

In order to prevent this erroneous coding, a low-pass filter 5 having the same frequency characteristics as the frequency characteristics of the high-pass filter 1 is provided, and the frequency component cut by the high-pass filter 1 is compensated by the low-pass filter 5 for the reproduced signal in the period T2. Accordingly, when viewing only the period T2 of the final signal output from this reproducing apparatus 10, the low frequency component of the reproduced signal S0 is removed by the high-pass filter 1, but the low frequency component removed by the high-pass filter 1 is added again by the low-pass filter 5 and the adder circuit 2. The result is the same as the case where the part of period T2 of the reproduced signal S0 does not receive any band restriction.

As explained above, the operation of the band restricting means including this high-pass filter 1 and the low-pass filter 5 may be summarized as follows. This band restricting means carries out band restriction that removes the low frequency component contained in the reproduced signal S0 by the high-pass filter for the period T1 for which the reproduced signal S0 has a high frequency and carries out no band restriction with respect to the reproduced signal S0 for the period T2 for which the reproduced signal S0 does not have a high frequency.

Next, the operation for the case where the level of the reproduced signal from the optical disc fluctuates will be explained by referring to FIGS. 5A to 5D.

For example, as shown in FIG. 5A, when the amplitude of the reproduced signal S0 is A, the amplitude of the detection signal S6 is larger than the comparison level C, therefore the pulse signal S7 becomes the high level. As a result, the switch 24 of the gain control circuit 4 shown in FIG. 4 becomes an open state, and the amplitude of the feedback signal S4 becomes the amplitude A equal to the amplitude of the reproduced signal S0.

Thereafter, for example, due to dirt and dust on the optical disc surface, as shown in FIG. 5A, the amplitude of the reproduced signal S0 is locally lowered to the amplitude B.

When the amplitude of the reproduced signal S0 is lowered in this way, at the point of time when the amplitude of the detection signal S6 reaches the comparison level C, the pulse signal S7 becomes the low level, and the switch 24 shown in FIG. 4 becomes ON.

When the switch 24 becomes ON, as shown in FIG. 5D, the amplitude of the feedback signal S4 becomes the same amplitude B as that of the reproduced signal S0.

As explained above, according to the optical disc reproducing apparatus 10, even in a case where the amplitude of the reproduced signal S0 is locally lowered due to dirt and dust on the surface of the optical disc, the amplitude of the feedback signal S5 can be lowered corresponding to this. By this, the divergence of the feedback loop can be effectively suppressed. Accordingly, the data detection can be carried out with a high precision even in a part where the amplitude of the reproduced signal is lowered without being affected by the low band noise, and also the density can be increased.

Note that the optical disc reproducing apparatus 10 is provided with a not illustrated AGC (Automatic Gain Control) circuit so as to maintain the amplitude constant even if a certain drop occurs in the amplitude (gain) and the optical disc reproducing apparatus 10 can adequately cope with such a local reduction of amplitude that cannot be handled by such an AGC circuit.

The present invention is not limited to the above embodiment. For example, in the above embodiment, the gain switching of the gain control circuit 4 was set to two steps as shown in FIG. 4, but it is also possible to the lower the amplitude by three or more steps by further providing some fixed resistors and switches in parallel to the fixed resistors 22 and 23. By this, the detection error at the amplitude lowered portion of the reproduced signal can be reduced, and further high precision detection can be carried out. Further, if necessary, it is also possible to handle not only the reduction of amplitude of the reproduced signal, but also a partial increase. Further, in the gain control circuit 4 shown in FIG. 4, it is also possible to use an invertible resistor without switching the resistance value by the switch 24.

Further, in the above embodiment, the gain adjustment of the gain control circuit 4 was carried out based on the pulse signal S7 as shown in FIG. 1, but it is also possible to adopt a configuration that carries out the gain adjustment based on the detection signal S6.

As explained above, according to an optical disc reproducing apparatus of the present invention, even in a case where the amplitude of the reproduced signal is locally lowered due to dirt and dust on the surface of the optical disc, the amplitude of the feedback signal can be lowered corresponding to this. By this, the divergence of the feedback loop can be effectively suppressed. Accordingly, the data detection can be carried out with a high precision even in the part where the amplitude of the reproduced signal is lowered without being affected by the low band noise and also an increase of density can be achieved.

What is claimed is:

1. An optical disc reproducing apparatus for reproducing from an optical disc on which data having a low frequency component is recorded, comprising:
    a high-pass filter for cutting off the low frequency component contained in the reproduced signal by a predetermined cut-off frequency;
    an envelope detecting means for detecting the envelope of said reproduced signal;
    a digitizing means for digitizing the signal based on said reproduced signal from said highpass filter and generating a digital signal;
    a gain controlling means for controlling the gain of said digital signal so that an amplitude of said digital signal becomes equal to or lower than the amplitude of said reproduced signal in accordance with said envelope;
    a low-pass filter for cutting off the high frequency component contained in said gain-controlled digital signal by said cut-off frequency and generating a feedback signal; and
    an adding means for adding said reproduced signal from said high-pass filter and said feedback signal from said low-pass filter and outputting the same as said reproduced signal to be digitized to said digitizing means.

2. An optical disc reproducing apparatus as set forth in claim 1, wherein
    said gain controlling means controls the gain of said digital signal based on a pulse signal obtained by digitalizing said envelope with a predetermined comparison level.

3. An optical disc reproducing apparatus as set forth in claim 1, wherein
    said gain controlling means switches the connection of a resistor of an internal portion in accordance with said envelope.

4. A signal processing apparatus for processing a reproduced signal reproduced from an optical disc, comprising:
    a band restricting means for applying a band restriction that removes the low frequency component contained in said reproduced signal in a period for which said reproduced signal has a high frequency and applying no band restriction with respect to said reproduced signal in periods other than the period for which said reproduced signal has said high frequency;
    a detecting means for detecting a level fluctuation of said reproduced signal; and
    a controlling means for controlling said band restricting means in response to said level fluctuation detected by said detecting means.

5. A signal processing apparatus as set forth in claim 4, wherein
    said band restricting means includes a high-pass filter for cutting off the low frequency component contained in said reproduced signal with the predetermined cut-off frequency and a low-pass filter for passing the low frequency component cut off by said high-pass filter.

6. A signal processing apparatus as set forth in claim 5, wherein
    said low-pass filter is a circuit for supplementing the signal of the frequency component cut off by said high-pass filter in periods other than the period for which said reproduced signal has said high frequency.

7. A signal processing apparatus as set forth in claim 5, further comprising
    a coding means for coding the output signal from said high-pass filter and supplying the coded signal to said low-pass filter.

8. A signal processing apparatus as set forth in claim 7, wherein
    said detecting means comprises an envelope detecting means for detecting the envelope of said reproduced signal.

9. A signal processing apparatus as set forth in claim 8, wherein
    said controlling means comprises a gain controlling means for receiving the coded signal coded by said coding means and controlling the gain of said coded signal.

10. A signal processing apparatus as set forth in claim 9, wherein
    said gain controlling means controls the gain of said coded signal in response to the detection pulse output from said envelope detecting means.

11. A signal processing method for processing a reproduced signal reproduced from an optical disc, comprising the steps of:
    applying band restriction processing that removes a low frequency component contained in said reproduced signal in a period for which said reproduced signal has a high frequency and does not remove said low frequency component contained in said reproduced signal in a period for which said reproduced signal does not have said high frequency;

controlling the gain of the reproduced signal to be apply said band restrinction processing in response to the level fluctuation of said reproduced signal reproduced from said optical disc; and coding said band-restricted reproduced signal.

12. A signal processing method as set forth in claim 11, wherein said band restriction processing is carried out by a high-pass filter for cutting off the low frequency component contained in said reproduced signal with a predetermined cut-off frequency and a low-pass filter for passing the low frequency component cut off by said high-pass filter.

13. A signal processing method as set forth in claim 12, wherein in the gain controlling step, the gain of the signal coded by said coding step is controlled in response to the level fluctuation of said reproduced signal reproduced from said optical disc.

14. A signal processing method as set forth in claim 13, wherein said gain-controlled coded signal is supplied to said low-pass filter.

15. A signal processing method as set forth in claim 14, wherein said low-pass filter is a circuit for supplementing the signal of the frequency component cut off by said high-pass filter in periods other than the period for which said reproduced signal has said high frequency.

16. A signal processing method as set forth in claim 15, wherein said level fluctuation of said reproduced signal is detected by detecting the envelope of said reproduced signal.

17. A signal processing method as set forth in claim 16, wherein the gain of said coded signal is controlled in response to the detection pulse output based on said level fluctuation of said detected envelope.

* * * * *